United States Patent
Press

[15] 3,683,954
[45] Aug. 15, 1972

[54] DOUBLE ACTION FLUID VALVE

[72] Inventor: Irving D. Press, West Orange, N.J.

[73] Assignee: Resistoflex Corporation

[22] Filed: Sept. 16, 1970

[21] Appl. No.: 72,847

Related U.S. Application Data

[63] Continuation-in-part of Ser. No. 858,575, Sept. 17, 1969, abandoned.

[52] U.S. Cl..............................137/269, 137/329.06
[51] Int. Cl. .........................F16k 43/00, F16k 51/00
[58] Field of Search......137/269, 270.5, 329, 329.01, 137/329.06, 329.02; 251/327

[56] References Cited

UNITED STATES PATENTS 3,198,034  8/1965  De Witte et al........137/269 X
3,472,268  10/1969  Sherwood..................137/269

*Primary Examiner*—W. Cary Nelson
*Assistant Examiner*—Robert J. Miller
*Attorney*—Ward, McElhannon, Brooks & Fitzpatrick

[57] ABSTRACT

A valve handle or other manipulator is connected to a valve stem by an intervening pair of concentric sleeves surrounding the stem. A keying element is shiftable to join the inner sleeve to either the stem or the outer sleeve for selected conjoint movement therewith. A reverse thread arrangement between inner sleeve and stem, on the one hand, and inner and outer sleeve, on the other hand, provides for selectably reversing the direction of longitudinal movement of the stem relative to the direction of handle manipulation and for correspondingly shifting the range of movement of the stem to bring a different one of two valve elements into operative relation with a respective seat.

9 Claims, 9 Drawing Figures

Patented Aug. 15, 1972
3,683,954
4 Sheets-Sheet 1
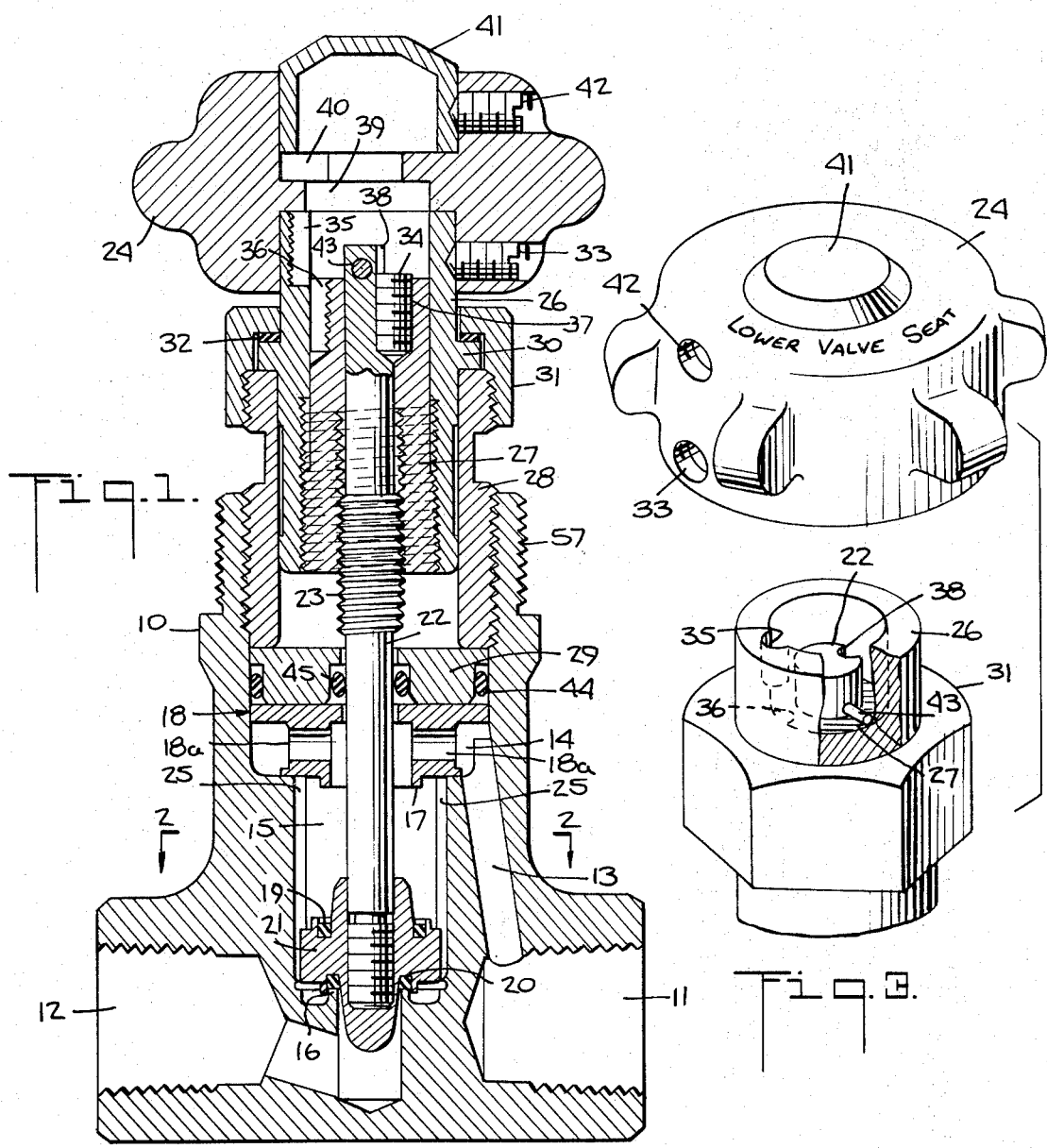
INVENTOR
IRVING D. PRESS
BY
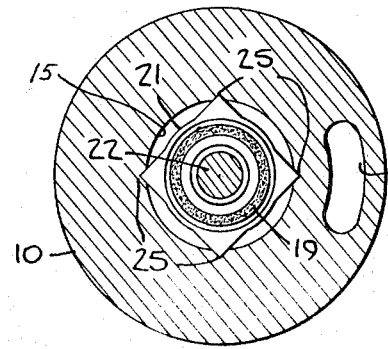
ATTORNEYS

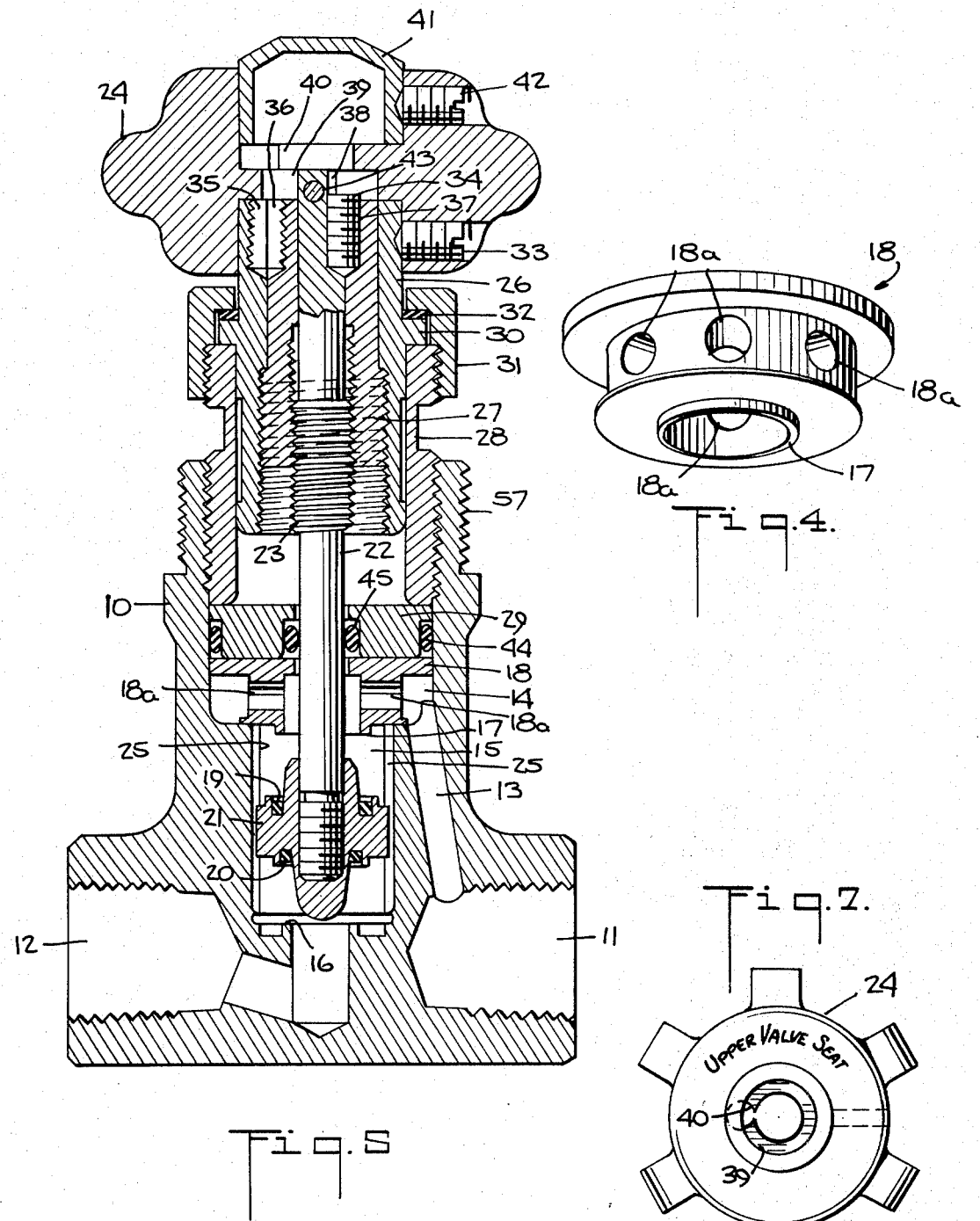

Patented Aug. 15, 1972

INVENTOR.
IRVING D. PRESS

BY

ATTORNEYS

DOUBLE ACTION FLUID VALVE

This application is a continuation-in-part of my copending application, Ser. No. 858,575, filed Sept. 17, 1969, now abandoned.

The present invention relates to a fluid valve and more particularly to a multiple seat valve.

In the conventional globe valve the valve element is manipulated by a valve stem to and from a cooperating valve seat, the latter being located in a passage through the valve housing. When this type of valve is employed in a critical control or processing system it is often necessary to shut down the system at an inopportune moment in order to replace a failing valve element or seat.

Special valves have been made in the past with auxiliary seats and valve elements, but all require a reverse or special manipulation of the valve actuator in order to open or close the auxiliary valve arrangement. Thus, in the prior art multiple seat valve, if the main valve seat were closed by a clockwise manipulation of the valve stem, then the auxiliary seat would be closed by a counterclockwise manipulation of the stem. In general, these plural seat valves were provided so that the auxiliary seat could close off the fluid passage while the main valve was being replaced. For one reason or another, these valves have not met with general acceptance in the art.

It is, therefore, an object of the present invention to provide a valve having a second valve element and seat which can be substituted for the main valve element and seat at the option of the user while retaining the conventional relationship between valve operator manipulation and valve operation. A further object of the invention is to provide a double action valve with an extended overall life.

In accordance with the invention, there is provided a fluid valve comprising a housing, a flow passage therethrough, two valve seats disposed in the passage, a valve element actuator, a pair of valve elements mounted on the actuator for cooperation, respectively, with a different one of the seats, a valve manipulator, and means interconnecting the manipulator with the actuator both for selectably reversing the direction of movement of the actuator relative to the direction of manipulation of the manipulator and for correspondingly shifting the range of movement of the actuator to bring a different one of the valve elements into operative relation with its associated seat.

The invention will be better understood after reading the following detailed description of certain presently preferred embodiments thereof with reference to the appended drawings in which:

FIG. 1 is a vertical sectional view of one embodiment of the valve in closed condition utilizing the lower valve seat;

FIG. 2 is a transverse sectional view through FIG. 1 along the lines 2—2 showing the bore in the housing and the top of the seat ring;

FIG. 3 is a perspective view of the top of the valve of FIG. 1 with the valve handle removed to show a detail of the operating mechanism;

FIG. 4 is a perspective view of the upper valve seat element;

FIG. 5 is a vertical sectional view of the valve of FIG. 1 but in wide open condition, still arranged for cooperation with the lower valve seat;

FIG. 6 is a fragmentary sectional view of the upper portion of the valve of FIG. 1 with the components arranged for cooperation with the upper valve seat;

FIG. 7 is a view of the opposite face of the handle from that shown in FIG. 3;

Throughout the drawings the same reference numerals are used to designate the same or similar parts.

Figure 8:
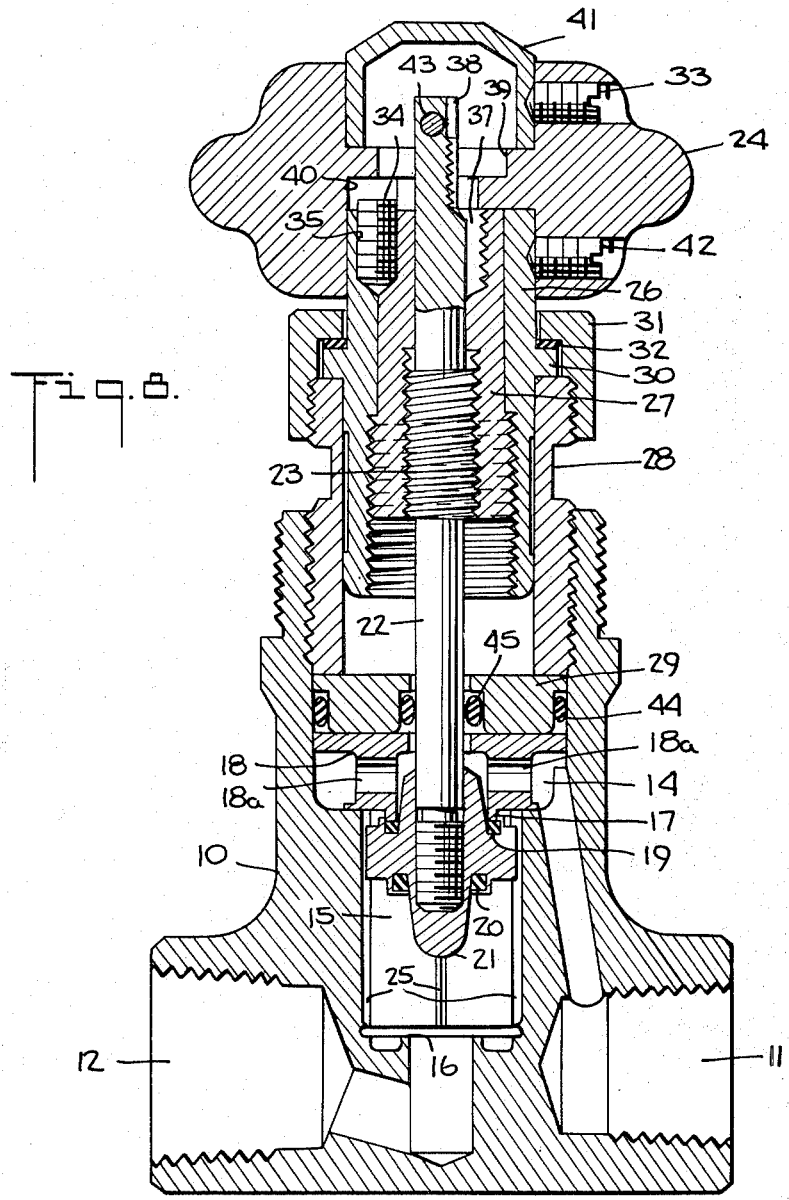
FIG. 8 is a view similar to FIG. 1, but showing the valve in closed position against the upper valve seat.
Figure 8:
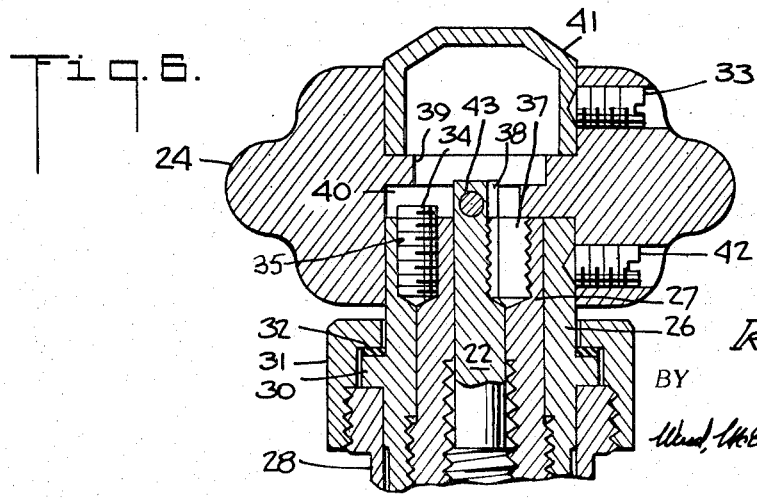

Referring now to FIGS. 1 through 8 of the drawings, the valve is shown as including a housing 10 having a flow passage therethrough, the latter consisting of ports 11 and 12, an interconnecting passage 13, an upper chamber 14 and an intermediate passage or bore 15. Two valve seats 16 and 17 are disposed in the intermediate passage 15. The seat 16 is formed integral with the housing 10 at the lower end of the passage 15 while the upper seat 17 is formed on the end of a removable valve seat element, 18, shown in detail in FIG. 4. Referring specifically to FIG. 4, it will be seen that the upper valve seat element 18 is provided with a plurality of apertures 18a to provide communication between the upper chamber 14 and the interior of the upper seat element 18.

A pair of valve elements in the form of resilient sealing rings 19 and 20 are carried by a valve element ring 21 which is threadedly secured to the lower end of a valve element actuator or stem 22. The actuator 22 is externally threaded over an intermediate section 23 with a right-hand thread.

A manipulator, here in the form of a valve handle 24, is provided for the manipulation of the actuator 22. The actuator 22 is mounted in the housing 10 for longitudinal movement and restrained against rotation by cooperation of the corners on the valve ring 21 with the vertical flutes or grooves 25 within the passage 15 of the housing.

An arrangement is provided for interconnecting the handle 24 with the actuator 22. This arrangement includes a pair of concentric sleeves 26 and 27 surrounding the stem 22. The outer sleeve 26 is journaled in the housing for rotation about its longitudinal axis. This is accomplished by providing it with a slip-fit within a bonnet element 28 which is threadedly inserted within the upper end of the housing 10 so as to bear against an O-ring retainer element 29. The outer sleeve 26 has a radial flange 30 which sits upon the upper end of the bonnet 28 and is clamped thereto by a cap nut 31. An anti-friction ring of P.T.F.E. or similar material 32 is inserted between the cap nut 31 and the flange 30.

As shown in FIG. 1, the outer sleeve 26 has an exposed end which projects from the cap nut 31 to which the handle 24 is removably joined by a set screw 33. The inner sleeve 27 is threadedly engaged with the stem 22 by a complementary right-hand thread. The sleeve 27 is also threadedly engaged with the outer sleeve 26 with threads of opposite hand, i.e., left-hand threads.

Means are provided for selectably joining the inner sleeve 27 to either the stem 22 or the outer sleeve 26 for conjoint movement therewith. This means takes the form of a keying member or set screw 34 and a series of threaded recesses. One such recess, 35, is located in the inner side wall of the outer sleeve 26. Another recess is located in the outer side wall of the inner sleeve member 27 at 36. A third recess, 37, is located in the inner side wall of the inner sleeve member 27, while a fourth recess is located at 38 in the side of the stem 22.

As seen in FIGS. 1 and 8, the set screw 34 projects or protrudes longitudinally beyond the exposed end of the outer sleeve 26 when installed in a cooperating pair of the aforementioned threaded recesses. As seen in FIG. 1, the screw 34 is installed in the recesses 37 and 38. In FIG. 8, the screw 34 is shown installed in the recesses 35 and 36. Collectively, the pairs of recesses constitute a threaded bore for receiving the screw 34 to a predetermined depth.

As shown in FIG. 1, the handle 24 has recesses or cavities 39 and 40 accessible from opposite faces of the handle. These recesses 39 and 40 are differently contoured in order to fit over the protruding keying member 34, with one face of the handle exposed when the keying member is in the position shown in FIG. 1 and with the opposite face of the handle exposed when the keying member is in the position shown in FIG. 8. The exposed faces of the handle may bear the legends best seen in FIGS. 3 and 7.

A dust cap 41 is shown in FIG. 1 as being held in place in the handle 24 by means of a set screw 42.

As best seen in FIG. 3, a transverse pin 43 is located in the upper end of the stem 22 to limit the downward movement thereof.

The operation of the valve described above should now be apparent. Referring to FIG. 1, the valve is shown in closed condition against the lower seat 16. The normal counterclockwise manipulation of the valve handle 24 will open the valve by rotating the outer sleeve 26 relative to the interlocked inner sleeve 27 and stem 22. The left-hand thread interengagement between sleeves 26 and 27 results in the stem 22 and sleeve 27 moving upwardly as viewed in FIG. 1.

When in the course of operation the valve ring 20 wears such that leakage develops when the valve is supposed to be closed, the mode of operation may be shifted. This is accomplished by fully opening the valve through counterclockwise manipulation of handle 24 until the parts assume the position shown in FIG. 5. Set screw 33 can be loosened so that the handle 24 can be removed from the sleeve 26. The set screw 42 can be loosened and the dust cap 41 shifted from the side shown in FIG. 1 to the opposite side of the handle and clamped therein by the set screw 33.

The set screw 34 can now be removed from the opening formed by recesses 37 and 38 and inserted in the opening formed by the recesses 35 and 36. This releases the inner sleeve 27 from the stem 22 and locks or keys the sleeve 27 to the outer sleeve 26. After replacing the handle, but inverted, the valve components will be as seen in FIG. 6.

As mentioned above, counterclockwise movement of the handle 24 opened the valve when the lower seat 16 was being used. Conversely, clockwise rotation of handle 24 operated to close the valve against the seat 16. In the very same manner, clockwise rotation of the handle 24 will bring the valve ring 19 into engagement with the upper seat 17 when the valve is in the upper seat mode. From FIG. 6, it should be apparent that as the handle 24 is manipulated in the clockwise direction, so will move both the inner and outer sleeves 26 and 27, while the stem 22 is restrained from rotating by its engagement with the flutes 25 in the housing. Hence, the right-hand thread engagement between the sleeve 27 and stem 22 will cause the stem to move in the upward direction as seen in FIGS. 6 and 8 until the condition of FIG. 8 is attained.

As mentioned previously, the handle 24 was placed on the outer sleeve 26 in FIG. 6 inverted from its position of FIG. 1. Due to the configuration of the recesses 39 and 40, the handle cannot be properly attached with the wrong face down. The legend exposed on the upper face of the handle 24 indicates, as shown in FIG. 7, that the upper valve seat is in use. Thus, at a convenient opportunity to shut down the system in which the valve is installed, the valve may be disassembled and a new valve ring 21 installed on the end of the stem 22. The parts can then be reinstalled in the housing and arranged to operate in the original mode with the valve cooperating with the lower seat 16.

Figure 9:
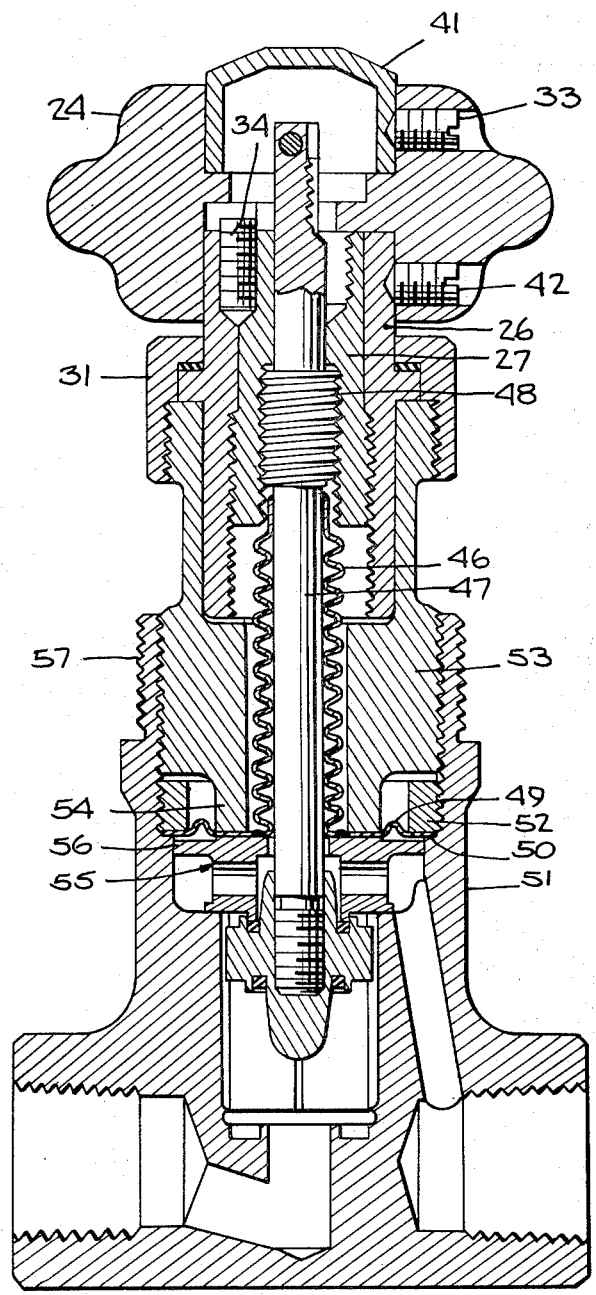
FIG. 9 is a vertical sectional view through a modification of the valve of FIG. 1.

As seen in FIGS. 1 to 8, a pair of O-rings 44 and 45 are used to establish a seal between the valve stem 22 and the housing 10 through the intermediary of the O-ring retainer 29. Many different sealing methods can be employed as an alternative. An example is shown in FIG. 9 to which attention is now directed. As seen therein, a metal bellows 46 is disposed around the valve stem 47 and welded or brazed thereto just below the threaded section 48. The lower end of the bellows is welded or otherwise joined to the inner margin of a diaphragm 49 whose outer margin is clamped between a shoulder 50 on the housing 51 and a lock ring 52 engaging the inner threads on the housing. The bonnet 53 is shaped with a lower flange or projection 54 which serves to hold the diaphragm against the upper valve seat 55. The diaphragm 49 is used to compensate for assembly tolerances only. One alternative construction would be to weld the lower end of the bellows 46 directly to the top of the upper valve seat member 55 and both thin down and extend radially outwardly the flange or rim 56 of the valve seat 55 so that it functions as a flexible member like a diaphragm and can be clamped directly to the housing. In all other respects the valve may be similar to that described with reference to FIGS. 1 to 8. If it is desired to hermetically seal the valve of FIG. 9, the diaphragm 49 can have its periphery joined to the housing 10 by welding instead of by ring 52.

A further advantage of the valve construction described above is that by appropriate construction of the upper and lower valve seats and valve elements it is possible to provide a dual function valve. That is, one of the valve seats and cooperating valve elements can be arranged for throttling or metering while the other seat and valve element can be designed for shutoff purposes. With this type of modification, the operator can select the type of operation he desires without removing and substituting an entire valve structure. Two distinct types of fluid flow control can be obtained with a single unit. Obviously, with this type of operation the legend on the handle may be altered to indicate the type of valving in operating rather than merely referring to which seat is being used.

For the purpose of illustration the legends shown in FIGS. 3 and 7 of the drawings on the opposing sides of the handle have been chosen with a physical connotation. However, it may be preferable to either add to the illustrated legend or substitute therefor a legend of functional character. Strictly by way of example, the legend: "Lower Valve Seat" may be either augmented or replaced by the legend: "OPERATING ON PRIMARY SEAT", while the legend: "Upper Valve Seat" may be augmented or replaced by the legend: "OPERATING ON RESERVE SEAT". Other legends and indicia will be readily apparent.

While a straight globe type valve configuration (the term "globe" being used in its broadest sense) has been illustrated and described, it will be apparent that other configurations such as an angle valve or an offset valve can be provided by suitable modification of the housing. The valves illustrated in the drawings have been shown provided with means in the form of threads 57 which cooperate with a nut, not shown, for mounting the housing in a panel or the like. Other mounting arrangements can obviously be employed.

Various other changes in construction are contemplated. Purely by way of example and without intention of limitation, either one or both of the resilient sealing rings 19 and 20 may be replaced by a metallic seal or other functional equivalent. The valve element ring 21 may be secured to the valve stem 22 by means other than the illustrated threads. Likewise the bonnet 28 may be joined to the housing by various known means other than the threaded arrangement shown. It is also contemplated that the handle 24 may be replaced by a pinion or other mechanical operator capable of imparting rotary motion to the sleeve 26.

Thus, having described the presently preferred embodiments of the invention, it will be understood that various changes in addition to those suggested above may be made in the details of construction without departing from the true spirit of the invention.

What is claimed is:

1. A fluid valve comprising a housing, a flow passage therethrough, two valve seats disposed in said passage, a valve element actuator, a pair of valve elements mounted on said actuator for cooperation respectively with a different one of said seats, a valve handle for the manipulation of said actuator, and means interconnecting said handle with said actuator both for selectably reversing the direction of movement of said actuator relative to the direction of manipulation of said handle and for correspondingly shifting the range of movement of said actuator to bring a different one of said valve elements into operative relation with its associated seat.

2. A fluid valve according to claim 1, wherein said actuator comprises an externally threaded valve stem mounted in said housing for longitudinal movement and restrained against rotation, and wherein said handle interconnecting means comprises a pair of concentric sleeves surrounding said valve stem, the outer sleeve being journaled in said housing for rotation about its longitudinal axis with an exposed end to which said handle is removably joined, the inner sleeve being threadedly engaged with said stem and said outer sleeve with threads of opposite hand, respectively, and means for selectively joining said inner sleeve to either said stem or said outer sleeve for conjoint movement therewith.

3. A fluid valve according to claim 2, wherein said valve handle is provided with means for joining it to said outer sleeve in one position only when said inner sleeve is joined to said outer sleeve, and in a different position only when said inner sleeve is joined to said stem, and means for signalling which position is occupied by said handle.

4. A fluid valve according to claim 2, wherein said means for selectively joining said inner sleeve to either said stem or said outer sleeve comprises: a removable keying member; and recesses in the inner side wall of said outer sleeve, both the inner and outer side walls of said inner sleeve, and the side of said stem for receiving said keying member.

5. A fluid valve according to claim 4, wherein said keying member when installed in a cooperating pair of said recesses protrudes longitudinally beyond said exposed end of said outer sleeve, and said handle is provided with recesses on opposite faces contoured to fit only over said protruding keying member into position on said outer sleeve with one predetermined face toward said housing when said keying member is installed to join said two sleeves together, and with the opposite face toward said housing when said keying member is installed to join said inner sleeve to said stem.

6. A fluid valve according to claim 4, wherein said keying member receiving recesses are so located as to be in position for switching the position of the keying member only when said valve is in fully open condition.

7. A fluid valve according to claim 2, wherein said inner sleeve is threadedly engaged with said stem with right-hand threads, and is threadedly engaged with said outer sleeve with left-hand threads.

8. A fluid valve comprising a housing, a flow passage therethrough, two valve seats disposed in said passage, a valve element actuator, a pair of valve elements mounted on said actuator for cooperation respectively with a different one of said seats, a valve manipulator, and means interconnecting said manipulator with said actuator both for selectably reversing the direction of movement of said actuator relative to the direction of manipulation of said manipulator and for correspondingly shifting the range of movement of said actuator to bring a different one of said valve elements into operative relation with its associated seat.

9. A fluid valve according to claim 8, wherein said actuator comprises an externally threaded valve stem mounted in said housing for longitudinal movement and restrained against rotation, and wherein said manipulator interconnecting means comprises a pair of concentric sleeves surrounding said valve stem, the outer sleeve being journaled in said housing for rotation about its longitudinal axis with an exposed end to which said manipulator is removably joined, the inner sleeve being threadedly engaged with said stem and said outer sleeve with threads of opposite hand, respectively, and means for selectively joining said inner sleeve to either said stem or said outer sleeve for conjoint movement therewith.

* * * * *